United States Patent [19]
Charrier et al.

[11] 3,728,513
[45] Apr. 17, 1973

[54] ELECTRIC ARC CUTTING APPARATUS

[75] Inventors: Paul Jean Raymond Charrier, Equeurdreville; Gilbert Georges Costedoat, La Montagne, both of France

[73] Assignee: Etat Francais represents Bar le Ministre charge de la Defense National Delegation Ministerielle Pour l' Armement, Paris, France

[22] Filed: May 20, 1971

[21] Appl. No.: 145,181

[30] Foreign Application Priority Data

May 21, 1970 France..................................7018471

[52] U.S. Cl..................219/70, 219/69 G, 219/125 R, 219/130, 219/144
[51] Int. Cl...............................B23p 1/08, B23p 1/14
[58] Field of Search.....................219/70, 125 R, 127, 219/130, 144, 232, 69 G

[56] References Cited

UNITED STATES PATENTS

| | | | |
|---|---|---|---|
| 3,659,071 | 7/1970 | Henderson | 219/69 G |
| 1,137,834 | 5/1915 | Bowers | 219/70 |
| 3,045,107 | 7/1962 | Espenlaub et al. | 219/127 |
| 1,560,699 | 11/1925 | Kramer et al. | 219/125 R |
| 1,493,864 | 5/1924 | Orr | 219/144 |
| 2,357,376 | 9/1944 | Baird | 219/125 R |

*Primary Examiner*—R. F. Staubly
*Attorney*—Waters, Roditi, Schwartz & Nissen

[57] ABSTRACT

An electric arc cutting apparatus comprises a carriage having wheels, one of which is guided in a rail so that the carriage can travel along a given path with respect to a workpiece. The wheel in the rail is adjustable on the carriage in a direction perpendicular to the rail. A frame is fixed on the carriage and carries a slidable holder for an electrode. A trigger is connected to the holder via a wire passing on pulleys, and by displacing the trigger, the holder and electrode secured thereto are conjointly displaced. One of the pulleys is spring-loaded to return the holder and electrode to an initial inoperative position when the trigger is released.

9 Claims, 3 Drawing Figures

ELECTRIC ARC CUTTING APPARATUS

BRIEF SUMMARY OF THE INVENTION

The present invention relates to apparatus for the adaptation of an electric-arc cutter with a carbon electrode to a semi-automatic process.

More particularly, the present invention relates to a semi-automatic device allowing cutting of a groove in sloping walls, curves or vertical walls.

For the construction of strong steel shells with a very high elastic limit, the quality of end welds must be very high.

In particular, in order to obviate the presence of cracks in the middle of double-V bevel welds, the back side of the first cuts must be magnetoscopically controlled.

Efficient control requires a surface condition obtained by forming a groove followed by grinding. Such grooving must be performed on walls which can be horizontal, sloping, curved or vertical.

Manual grooving with a portable torch is conventional and is undesirable since it depends on the operator's skill, it requires considerable finish grinding, and sometimes it requires a further machining of the bevels.

Semi-automatic or automatic grooving machines take up much space and are too heavy for use in the required positions.

An object of the invention is to provide groove cutting apparatus in which the above drawbacks are overcome.

According to the invention, the groove cutting apparatus is lightweight and can be used in any position. Grooves formed with this apparatus are absolutely smooth and uniform. No subsequent grinding or machining is required.

The apparatus according to the invention comprises a carriage supported for guided movement with respect to a workpiece, a frame fixed on said carriage, a slidable holder in said frame for an operative electrode, and means coupled to said holder to displace the same in said frame and thereby adjust the position of the electrode with respect to the workpiece.

DETAILED DESCRIPTION

Figure 1:
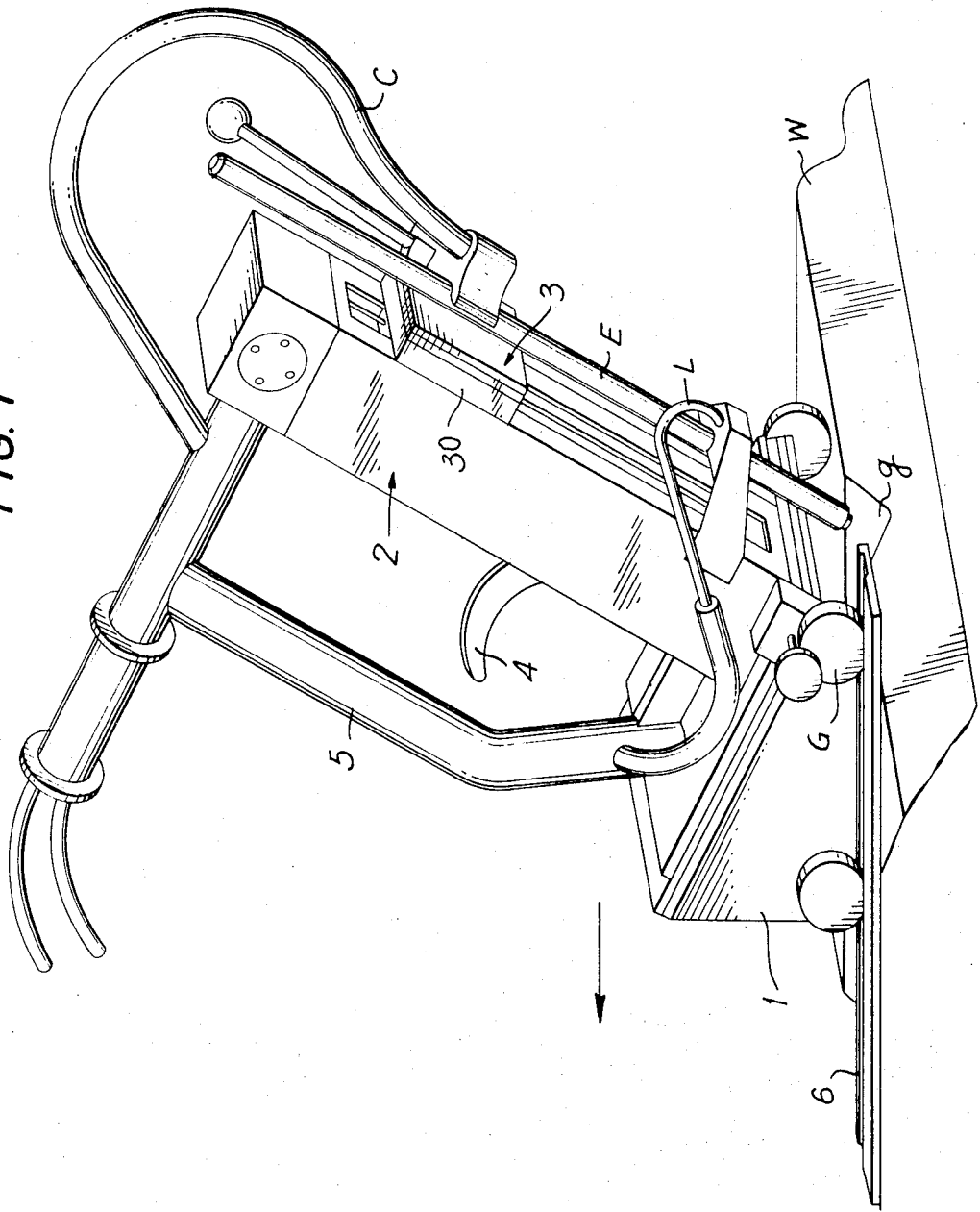
FIG. 1 is a diagrammatic perspective view of the apparatus according to the invention.

Referring to FIG. 1 of the drawing, therein is seen a movable carriage 1 to which is attached an inclined frame 2 carrying an electrode E supported in a holder 3 which is guided for sliding movement in the frame 2. The electrode holder 3 is insulated from the carriage 1 and in addition to carrying the electrode E also carries electrical lead cable C.

The holder 3 is coupled inside frame 2 to a sliding trigger 4, (as will be explained in greater detail later) such that by pulling on the trigger 4, the holder 3 is caused to descend on frame 2, whereas when the trigger 4 is released, the holder 3 is returned by a spring to its initial position, in which electrode E is retracted from a workpiece W.

The compressed air required for the operation of the electrode, e.g. for cutting a groove g in the workpiece, is supplied by a compressed air line L secured to the frame 2.

Attached to frame 2 is a hand grip 5 which is hollow and through which passes the inlet line L for compressed air and the electrical cable C. The grip 5 permits engagement of the device and its manipulation.

Attached to the workpiece or to a fixed support is a guide rail 6 which is grooved and serves to guidably support at least one wheel of a wheel assembly G on the carriage during travel thereof longitudinally along the workpiece. The wheel of the assembly G of the carriage can be adjusted laterally to permit fine adjustment of the electrode relative to the workpiece to enable the groove to be cut at an exact position in the workpiece.

Figure 2:
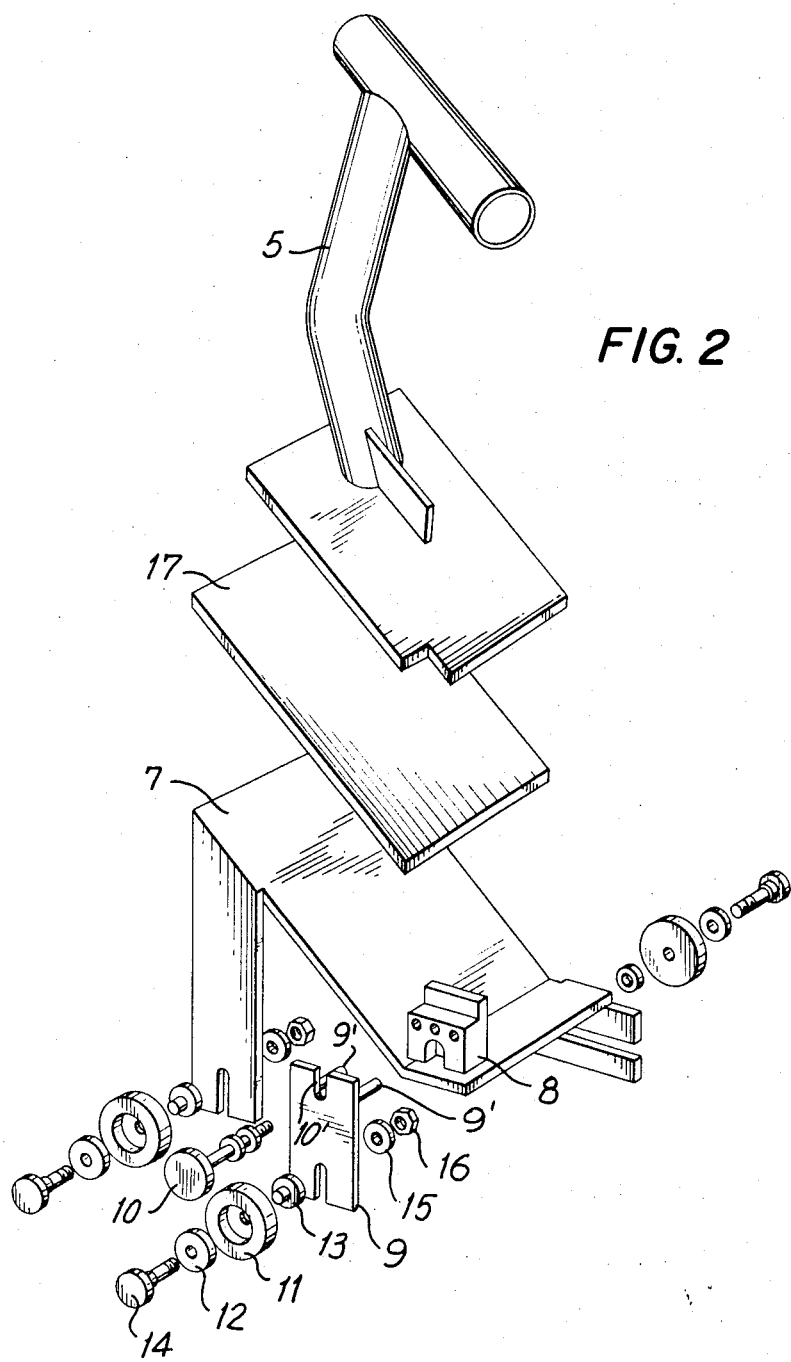
FIG. 2 is an exploded view of a carriage of the apparatus of FIG. 1.

The carriage 1 is shown in greater detail in FIG. 2 and consists of a lightweight bracket 7 provided with three supports for receiving the wheel assemblies.

The left rear wheel assembly G which is adjustable transversely with respect to the carriage is mounted on a support 8 fixed on bracket 7. A plate 9 includes a pair of prongs 9' which slidably fit in a corresponding pair of holes in support 8, and an adjusting screw 10 is mounted loosely in a slot 10' formed in the plate 9, the screw 10 having flanges which flank the opposite sides of the plate 9 at slot 10' thereby axially coupling the screw 10 and plate 9. The screw 10 is threadably engaged in support 8 such that by rotating screw 10 in opposite directions, plate 9 is moved towards and away from support 8. The wheel 11 is secured to plate 9 and is adjusted transversely with respect to carriage 1 as the plate 9 is moved relative to the support 8. Wheel 11 is secured to plate 9 by means of a bearing 12, and a flange washer 13 which are mounted on a pin 14 secured by a washer 15 and a nut 16.

The attachment of each of the wheels at the other wheel assemblies is the same as that disclosed above for assembly G with the exception that the other wheel assemblies are directly secured to fixed supports on bracket 7 rather than to movable plate 9.

The frame 2 and the hand grip 5 are rigidly attached to the bracket 7 via an intervening insulation sheet 17. The hand grip 5 is constituted as a welded tube of polyvinyl material.

Figure 3:
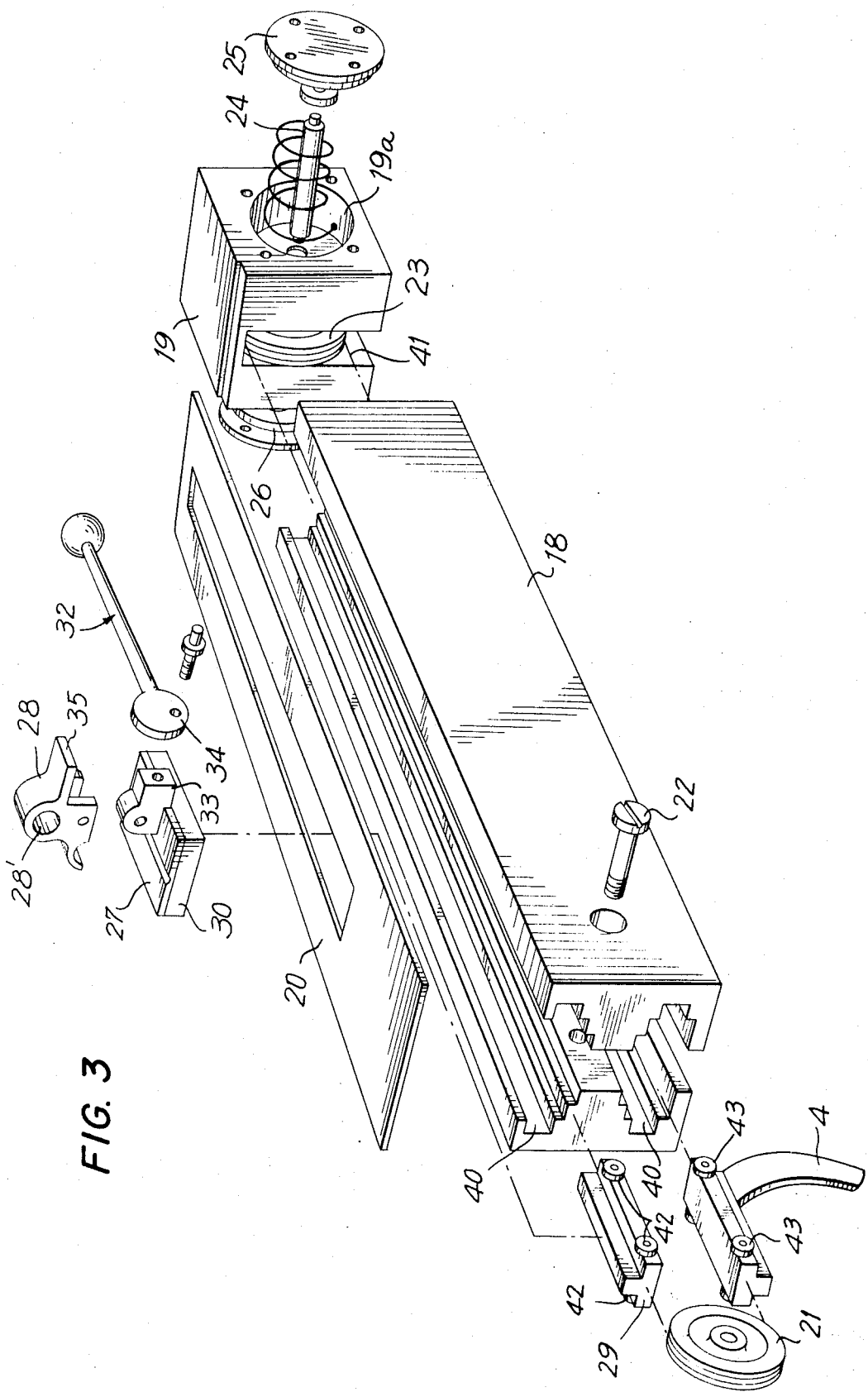
FIG. 3 is a diagrammatic perspective view, partly exploded, of a frame of the apparatus of FIG. 1.

The frame 2 is made of nylon or other suitable plastic material and comprises three essential components, to wit, slide block 18, rear member 19 and cover 20 (FIG. 3). A lower nylon pulley 21 is rotatably mounted in the slide block by a steel spindle 22 and a top nylon pulley 23 is fixed on steel spindle 24 which is rotatably mounted in the rear member 19. Lateral recesses 19a are formed in each side of the member 19 and they house helical springs connected between spindle 24 and member 19 to urge the spindle to an initial position. The recesses also receive nylon cover plugs 25 and 26.

The slide block is internally machined with guides 40 to receive slidable trigger 4 and a slide 29 of the electrode holder 3. The trigger 4 and slide 29 are connected by a metal wire 41 passing around the pulleys 21 and 23 and coupled therewith such that by displacing trigger 4 and thereby slide 29, the pulleys are rotated. This causes the helical springs to stress and when the trigger 4 is released, the spindle 24 returns to its initial position under the action of the stressed springs to cause the pulleys 23 and 21 to rotate and return the holder 3 and trigger 4 to their original positions. To facilitate travel of the trigger 4 and the slide 29 in guides 40, rollers 43 are mounted on the trigger 4 and rollers 42 on the slide 29.

The electrode holder 3 is constituted of a brass part 27 attachable to slide 29 via interposed insulation sheet 30 (FIG. 1). A brass part 28 is pivotably mounted on part 27 for clamping electrode E against the part 27. The part 28 has a bore 28' for receiving the cable C. A locking lever 32 is eccentrically connected to a lug 33 on part 27, and the lever 32 carries a cam 34 which contacts a ledge 35 on part 28 to pivot the part 28 on lug 33 when lever 32 is rotated to clamp the electrode E between parts 27 and 28.

The electrical cable C and the compressed air line L extend into the hand grip 5.

Rail 6 is made of steel, a lightweight alloy or plastic, and is flat with a machined runway in the upper surface. The rail can be a single length or composed of aligned sections attached to the workpiece by mechanical or magnetic means.

The device according to the invention can be used industrially whenever a groove cutting operation is required in surfaces which are horizontal, curved, or inclined.

Other operations which can be undertaken are the cleaning-up of the back sides of the first cuts of unsupported butt welds, particularly welds in steel with a very high elastic limit, the removal of steel welds of very high elastic limit, the removal of faulty welds, and ingot fettling.

In operation, the electrode E is clamped in the holder 3 in a particular position with respect to the workpiece as determined by the operation to be performed. The electrical supply is connected to lead cable C and the air supply to line L. The trigger 4 is then displaced to move the holder 3 and the electrode E therewith until the electrode is in operative lowered position to carry out the intended function. The grip 5 is then engaged while the trigger is held in position and the carriage 1 is advanced along the workpiece in the direction of the arrow in FIG. 1, the carriage being guided in rail 6. When the carriage has traversed the workpiece, the trigger is released to permit the electrode to return to its original inoperative position and the hand grip is released after the carriage has been moved (if necessary) to a stable position.

The position of the hand grip 5 and the trigger 4 is such that an operator may operate the device with one hand.

The frame 2 is pivotable laterally on carriage 1 in a manner not shown to permit the electrode to be tilted with respect to the workpiece for forming a groove therein with sloped flanks as shown in FIG. 1. The frame 2 may be mounted on a longitudinal pivot shaft on the carriage to permit the lateral pivotal movement, and a clamp can serve to lock the frame 2 in fixed position on the carriage in any of the tilted attitudes.

What is claimed is:

1. Electric arc cutting apparatus comprising a carriage supported for guided movement with respect to a workpiece, a frame fixed on said carriage, a slidable holder in said frame for an operative electrode, first means coupled to said holder to displace the same in said frame and thereby adjust the position of the electrode with respect to the workpiece, said first means comprising a manually displaceable trigger in said frame operatively coupled to said holder, and second means to return the holder to an initial position when the trigger is released, said second means comprising a spring means operatively coupled to the holder, said first means further comprising a pair of spaced rotatable pulleys connected to said frame, a wire passing around said pulleys and coupled therewith to rotate the pulleys as the wire is advanced, said trigger and holder being secured to said wire, and said spring means being connected to one pulley and said frame.

2. Electric arc cutting apparatus comprising a carriage supported for guided movement with respect to a workpiece, a frame fixed on said carriage, a slidable holder in said frame for an operative electrode, means coupled to said holder to displace the same in said frame and thereby adjust the position of the electrode with respect to the workpiece, said means comprising a manually engageable trigger, means supporting said trigger for linear displacement in said frame, and cable means connecting said trigger and holder so that the holder undergoes conjoint linear displacement in the frame with said trigger but in opposite direction, a hollow hand grip attached to said carriage and frame to manipulate the carriage, an electrical supply cable for said electrode connected to said holder and extending through said hollow hand grip, and a compressed air supply line connected to said frame and also extending in the hollow hand grip.

3. Apparatus as claimed in claim 2 comprising a fixed rail for guiding the movement of the carriage, said carriage including a plurality of wheels at least one of which rides in said rail.

4. Apparatus as claimed in claim 3 comprising means connecting the wheel which rides in the rail to said carriage for lateral adjustment relative to the rail.

5. Apparatus as claimed in claim 2 comprising means on said holder to releasably clamp the electrode thereto.

6. Apparatus as claimed in claim 5 wherein said means to releasably clamp the electrode comprises a pivotal locking lever on said holder, and a pivotable clamping member on said holder engagable by said locking lever to be pivoted to a position in which the electrode is clamped between the clamping member and the holder.

7. Apparatus as claimed in claim 2 wherein said trigger faces said hollow hand grip to enable operation of the trigger and holding of the hand grip with one hand of the user.

8. Apparatus as claimed in claim 2 wherein said frame has opposed parallel guide grooves in which travel said holder and said means which supports the trigger.

9. Apparatus as claimed in claim 2 wherein said frame is fixed to said carriage to extend upright therefrom at a given inclination, said holder being movable in the longitudinal direction of said frame.

* * * * *